Jan. 20, 1970 B. ALAIMO 3,491,341
RECORDING SYSTEM
Filed Nov. 1, 1966
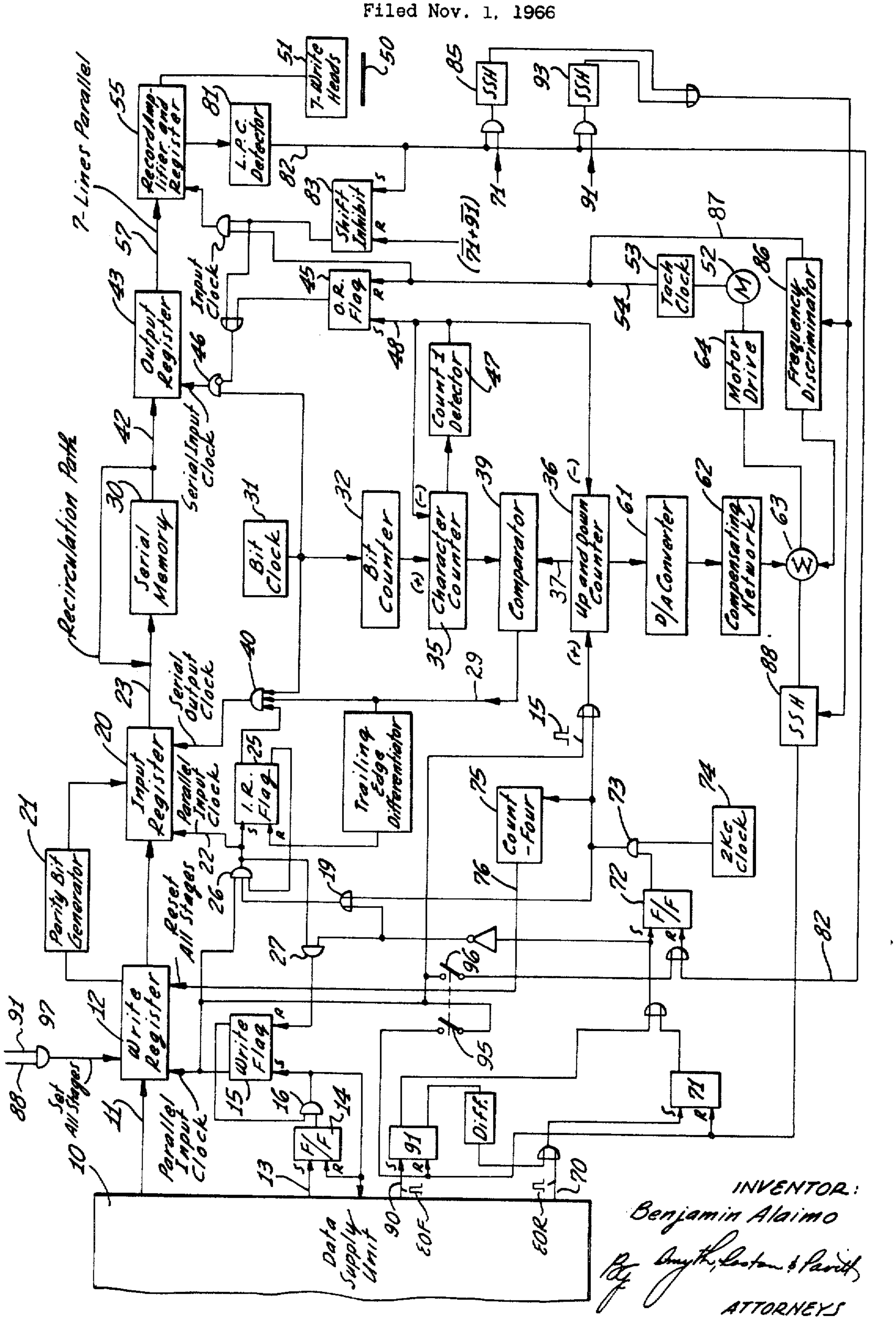
INVENTOR:
Benjamin Alaimo
By [signature]
ATTORNEYS United States Patent Office 3,491,341
Patented Jan. 20, 1970

3,491,341
RECORDING SYSTEM

Benjamin Alaimo, Camarillo, Calif., assignor to Minnesota Mining and Manufacturing Company, St. Paul, Minn., a corporation of Delaware Filed Nov. 1, 1966, Ser. No. 591,319
Int. Cl. G11b *13/00;* G06f *1/00, 7/00*
U.S. Cl. 340—172.5 26 Claims

ABSTRACT OF THE DISCLOSURE

A data transfer system is disclosed in which a recirculating delay line serves as buffer between data supply and recording thereof on tape. The filling state of the buffer is monitored and used to control the advance of the tape during periods of data supply. When data supply ceases, the buffer is emptied through data simulation and subsequently the tape is driven over a predetermined distance before being stopped.

The invention relates to a data transfer system particularly of the type in which digital data provided by a source of digital signals are to be recorded, for example, on magnetic tape.

Digital tape units have long been used as computer memory extensions, whereby the computer will at times empty a portion of its memory by causing recordation of the content thereof on magnetic tape. Principal problems arise from the fact that either unit, i.e., the source of digital data and the recorder unit has its own specific operation requirements. Since in this cooperative relationship the magnetic tape unit is the one which is slower and burdened with mechanically moving parts, the digital data source has to be adapted to the capabilities of the tape unit. This in turn deteriorates the performance of the digital data source as processor, i.e., the source of digital data, for example, an electronic high speed computer, is required to endure waiting and idle periods, for example, until the tape unit has recorded data and recordation has to be terminated, it is inevitable that a certain period of time elapses, beginning with the actual termination of data supply, before the tape unit is again in an operative position to record new data.

One of the principal sources for this delay is the fact that the tape recording has been carried out usually with a constant tape speed, because proper recognition of data during subsequent read-out or reproducing requires constant bit spacing on the tape in the direction of tape propagation. This means that the tape has to be brought up to full or rated speed from a stop position before recording can commence and the tape must travel at full speed until the last data item has been recorded. The combined periods for stopping and restarting form the minimum period of time here which has to be allowed for in between, for example, two sequential recording operations. Should the processor desire to resume the data supply earlier, still a minimum gap on the tape in between such sequential recordings of groups of data has to be provided because such groups may subsequently be read-out at completely different times, requiring full stopping and starting operations as between full speed and zero in between the different read-out phases.

Recently the concept of an asynchronous recorder has been developed according to which a buffer is interposed in between the tape unit and the source of data. The tape unit is chosen in a manner which permits recording whenever the tape is in motion and the recordation is sequenced in dependence upon the tape speed to ensure constant bit spacing. Recording is carried only when the buffer contains a certain minimum number of data for recording, which in turn means that the tape is caused to move only when the buffer contains at least some data. The data source, for example a computer, communicates directly only with the buffer. The buffer is always kept ready to accept data from the source, irrespective of the readiness of the tape itself to receive recordations; and while the buffer fills, the tape unit is being started.

Should a processor terminate the data supply, recording does not terminate but the tape unit is caused to slow down and stop before depleting the buffer completely. In order to attain the desired overall control characteristics the content of the buffer is metered and that content is used to control the speed of the tape unit. Without further measures a completely gapless record could be obtained and no limitation needs to be imposed on the data source with regard to any pause duration in between the supply of the data groups, except, of course, that the average data supply rate must not exceed the recording rate of which the tape unit is capable.

This improvement in the cooperation between tape unit and data source can, however, be realized fully only as long as the read-out process is likewise an asynchronous one using a buffer in between the tape reading elements and the input of what then is a data receiver. If, however, the tape is to be used exchangeably, a gap must be provided in between the recordings of such groups, also called inter-record gap. A gap of about ¾" is commonly provided for the purpose.

The invention thus relates to an asynchronous recording system with buffer enabling the production of an inter-record gap in a manner keeping the thus enforced pause in between the supply of two sequential data groups to a minimum. More generally, the invention relates to improvements in the relation between a data source, a buffer and a recording unit.

It is suggested to use a serial memory as buffer, for example, in the form of a long recirculating delay line. The data supplied by the source are usually organized in characters, each character being defined by a plurality of bivalued bits. The data are usually (but not necessarily) provided in a serial-by-character, parallel-by-bit format, with a plurality of characters forming one of the above defined groups. All characters fed into the buffer pass therethrough in a serial-by-bit format. The delay line has a recirculation period below the rate of character supply by the source.

A pair of counters is used to track characters in the memory. One counter provides an indication of the current number of characters held in the buffer; this counter is incremented each time a character is passed from the source into the buffer and this counter is decremented each time a character is withdrawn for purposes of recording. Except in a special situation, the second counter of this pair of counters is a recirculating counter to keep track of the circulation of characters in the delay line. The second counter defines in time the instants when a character can be fed into the delay line and when a character can be withdrawn therefrom. One instant is given by similarity of counting results between the first and the second counter and the other instant is the passage of the second counter through zero or through the recycling point. The character circulating the longest in the buffer is withdrawn as soon after the respectively preceding character has been recorded and as phasing by the second counter permits; analogously, actual feeding into the buffer occurs as soon after a character has been supplied by the source also as the phasing by the second counter permits.

As long as the source supplies data, the tape unit will be controlled by the first counter, the control characteristics being such the tape tends to run at a speed so that the speed dependent buffer withdrawal rate equals the supply rate from the source. This operative relationship is changed after the last character of a group of characters has been supplied. After such a last character has been supplied by the source at least one end-of-group identification marker is generated by the control circuit for the buffer system. Conveniently this identification mark may comprise a plurality of, for example, from all-zero bit characters followed by a character which places all of the control stages of the recording transducers into the same state, to thereby become what can be called a longitudinal parity check character for each of the individual recording tracks on the tape. This group of five characters can also be called end-of-record marker. Without further measures, the first counter would not be incremented any more after the last character has been supplied for the time being, thus the resulting tendency of buffer depletion evidenced by a continued decrementation of the first counter would cause the tape drive to slow down and stop. The production of a gap requires a temporary override for this normal operation, but should be carried out in a very short period of time and in three phases after the processor has issued the last character of a block or group or record.

The first phase includes the period in which the above mentioned end-of-record identification marker in form of five characters is being produced. As stated, these characters are fed into the buffer and are treated as regular characters. In addition, and still during the first phase, a continuaton of data supply to the buffer is simulated temporarily, in that a sequence of all-zero characters is formed and they are continuously fed into the buffer. These characters are also counted regularly in the first counter so that for a certain period of time the tape unit continues to operate as before described. The motor is not being slowed down or even stopped. On the contrary, the simulated data supply may occur at a faster rate than the regular supply so that the tape drive actually accelerates.

All characters from the source plus the five end-of-record characters will thus pass through the buffer and will be withdrawn therefrom for recording. Thereafter the buffer contains only all-zero characters, and is thereby in effect empty, even though the control system appears to indicate it is still full or at least partially full. The end-of-record markers before being recorded can be monitored at the output side of the buffer and the appearance thereof can be used to introduced a second phase of the gap mode operation, in which the tape unit drive is not controlled any more from the content of the buffer but is accelerated to a higher speed. The recordation of the all-zero characters may continue during gap production. If any of the Non-Return-To-Zero methods are employed, a uniform magnetization is imparted upon each of the recording tracks.

Due to the high speed, at least most of the portion of the gap is produced at a speed which on the average is much higher than the normal recording speed. The time of high speed advance is being metered in accordance with the desired gap requirements (for example ¾") and after the time necessary to move the tape over this distance has elapsed, the third phase is introduced to rapidly, dynamically and, if necessary, mechanically break the motor to come to a complete stop.

Thereafter the unit is immediately ready to accept again new data from the source because the buffer is completely empty and thus available at maximum capacity to accept a rapid flow of data from the source even through the characters are not recorded immediately. After the tape drive had come to a stop the control of the tape drive was turned over again to the counter metering the content of the buffer so that the inflow of characters will in turn cause the tape drive to start. In view of the asynchronous technique employed, the withdrawal of characters from the buffer for recording may commence as soon as the tape is set into motion. As the buffer continues to fill, the tape is accelerated and equilibrium is maintained if for a particular speed of the tape, the rate of withdrawal equals the rate of supply.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanyling drawing, in which:

Proceeding now to the detailed description of the drawings, in FIGURE 1 thereof there is shown in block diagram form the preferred embodiment of the present invention. Data are provided by a computer or by any other processor or by a data acquisition device denoted in general with reference numeral 10 and providing data in a parallel-by-bit format and in sequential characters to the output lines or channels 11. These data are organized, for example, in a format wherein six bits define a character. The unit 10 provides these characters at a rate and at a degree of regularity which may be determined exclusively by the unit itself, except that a particular maximum rate must not be exceeded. The data which appear in channel 11 are applied to a write register 12. The providing of such data is accompanied by a write clock signal issued by unit 10 into a line 13. This is an external clock signal for the device in accordance with the present invention which is external to the processor 10, but this signal is an internal clock signal for the unit 10. A write command flip-flop 14 is set by each signal 13.

Whether or not the data applied through lines 11 to the register 12 can be gated into the register 12 depends on the state of a flag flip-flop 15, which is in the reset state whenever the write register 12 is capable of accepting data, whereas flag 15 is set when the data held in the write register 12 have not yet been transferred. Thus, whether or not the output of the flip-flop 14 can be used for clocking signals into the register 12 depends on whether or not the write flag flip-flop 15 is reset. The status of flag 15 is monitored by an "AND" gate 16 responding to a coincidence of the reset state of flag 15 and of the set state of flip-flop 14. Further control details are immaterial, presently it is assumed that a "true" output of "and" gate 16 sets the flag 15, and the set state thereof in turn clocks the data in line 11 into register 12. The output of gate 16 is used additionally to reset flip-flop 14. It is possible to use the output of "and" gate 16 still further, namely to signal to the processor 10 that the write register 12 has in fact accepted the data which were applied to the channels 11. This, so to speak, completes the dialog regarding the inquiry on the part of the processor 10, evidenced by a signal in line 13, whether or not the external device which is presently described, is capable of accepting the digital data as provided by the processor 10 to its output channel 11.

Since we presume that the data applied to the register 12 have six bits per character, the register 12 is therefore, comprised of six flip-flops having their set and reset input sides respectively controlled by the channel 11. The flip-flops each having a clocking input receiving the set state signal from flag 15 for a parallel input clocking.

A parity bit generating device 21 monitors the number of "one" bits in the write register 12, and depending on whether the number of "one" bits in the wire register 12 is odd or is even, device 12 creates a parity bit as the seventh bit for such a character. It is immaterial here whether the system is run with odd or with even parity; it is important only that out of the six character bits a seventh bit is created by the parity bit generator 21. Subsequently a character is deemed to comprise seven bits.

The data held in the write register 12 are then transferred therefrom to a memory input register 20 which has seven stages, six for the character bits and one for the partiy bit generated by device 21, and the transfer to the input register 20 is controlled by a signal in line 22 which is used to provide transfer clock pulses to the flip-flops of which the input register 20 is comprised. The generation of the clock pulses in line 22 depends on several conditions. First of all, the input register 20 must be empty, i.e., it must be in a condition permitting the acceptance of data. This is monitored by an input register flag flip-flop 25. This flag flip-flop 25 is in the set state as long as data are being held in the input register 20, and the flip-flop 25 is reset if new data can be set into the input register. Therefore, the reset state of flip-flop 25 controls the production of a clock signal for line 22 through a gate 26.

The gate 26 additionally receives an output signal from the flag 15 which was set by a true signal from the gate 16 at the time when a character was set into the write register 12. Gate 26 receives a third signal from an "OR" gate 19 which signal is true for normal operation. The output of gate 26, additionally, controls a normally open gate 27 to reset the write flag 15, because the transfer of data from the write register 12 into the input register 20 is indicative of the fact that now the write register 12 is again available for accepting new data from the processor 10. Furthermore, subsequent copying of the same date held in register 12 into register 20 is to be inhibited, during normal operation, so that a subsequent reset state of flag 25 can be operative for the transfer of data to register 20 only if in the meantime flag 15 was set anew, which in turn occurs only after a new character has been accepted by the register 12.

The register 20 can also be construed to be parallel-serial converter. The seven stages of the input register 20 receive the six data bits from register 12 and the parity bit from the generator 21 in a parallel-by-bit format, but the data will leave the register 20 through an output channel 23 in a serial-by-bit format. The principal memory of the inventive system is a delay line 30 provided for recirculation of data fed to the memory 30 through the line 23. Of course the feeding of data into the serial memory 30 must be strictly timed and for this reason there is provided a circuit network to be described next.

First of all there is a bit clock 31 which gives the principal rate of bit circulation in the serial memory 30. Since seven bits constitute the format of a character there is provided a bit counter 32 which is a recirculating counter receiving as counting pulses the clock signal from the bit clock 31 and producing an output signal in a line 33 each time seven bits have been counted. Therefore, the output line 33 provides pulses at a rate with which characters can recirculate in the memory 30.

The character pulses in line 33 are passed to a character counter 35 which simply counts the number of character pulses and thereby keeps track of the characters as they run through the memory 30. The counter 35 has a recycling period equal to the recycling rate of a bit in memory 30, as long as only its (+) input receives the character pulses from bit counter 32.

Next there is provided an "up and down" counter 36 which can also be described as a character register. In a manner which will be described more fully below, the "up and down" counter 36 counts the number of characters actually held in the serial memory 30 and in the input register 20. The output channel 37 of counter 36, therefore, holds at any time a digital number which is representative of the state of filling of the serial memory 30 (plus register 20).

A comparator 39 compares the number held by the "up and down" counter 36 and applied to the output line 37 thereof, with the character count of the character counter 35 as it progresses during operation. The system now operates for the insertion of data into the memory as follows. Whenever the count number the counter 35 has reached matches the count number of the counter 36, then a character can be transferred from the input register 20 to the serial memory 30. The association of the character counter 35 with the serial memory 30 is thereby such that the coincidence at the two inputs of comparator 39 is indicative of the fact that the character which was the last character that had been previously set into the serial memory 30 has just been recirculated, and particularly the last bit thereof has been reset into the memory 30. This is also indicative of the fact that now there is an empty space in the memory into which a new character can be set, and that new character is drawn from the input register 20.

It is of course necessary that the serial memory 30 is never completely full. How this can be ensured will be described below, so that we can say, that after the recirculation of the respective last or previous character, there is in fact at least one empty character space in the serial memory 30, into which a new character can be set.

The output of comparator 39 now controls a command line 29. As schematically indicated, there is a gate 40 which receives the bit pulses from the bit clock 31, the set-state signal from flag 25, and the coincidence signal from comparator 39. The output signal of comparator 39 remains true for the duration of one character period which in turn covers seven bit clock signals from the clock 31. These seven bit clocks as provided by "AND" gate 40 now control the transfer channel 23 which couples the input register 20 in a serial-by-stage format to the input side of the serial memory 30. The channel 23 can be construed as extending into the register in that suitable gating means are enabled by the bit-clock pulses from gate 40 to transfer the seven bits serially through the register 20 into memory 30. The set state signal of flag 25 is true only when input register 20 holds in fact a character.

The trailing edge of the comparator output signal (differentiation) is used to reset the flag flip-flop 25, because the trailing edge of this coincidence signal from comparator 39 is indicative of the period of time now commencing in which on the input register 20 can again accept a new character. One can see that it is essential that the serial memory 30 has a recycling rate which is above the maximum frequency with which the processor 10 may desire to furnish characters, so that the period between supply of a character and its storage in the buffer memory 10 is shorter than the period in between two characters in channel 11. This is one operational condition but another will follow below.

The principal purpose of the memory 30 is to store characters temporarily, so that they can be written onto, for example, a magnetic tape 50 by means of write or recording transducer heads 51 in a parallel-by-bit and serial-by-character format, and at a rate determined by the characteristics of tape movement rather than by condition set by the computer or processor 10. Therefore, the serial memory 30 operates as a buffer which adapts the computer operations to the tape operation, so that neither unit or equipment is handicapped by particular timing requirements of the other.

The tape 50 is transported by motor 52 preferably will be a capstan motor which drives the tape 50. In synchronism with the transport of the tape 50 clock signals are being produced in a device schematically denoted by the block 53. Advantageous particulars of this clock 52 are disclosed in my copending application Ser. No. 574,089 filed Aug. 22, 1968. The principal feature of this clock 53 is that it generates pulses at a rate strictly proportional to the passage of incremental tape portions underneath the write heads 51. If the tape runs at a constant speed the pulses from the generator 53 will follow at a corresponding constant rate. On the other hand, the frequency of these pulses from generator 53 will vary inversely with the speed of the tape 50.

Briefly, the motor 52 may drive a tach disk bearing regularly spaced markers, and the clock pulses are derived from these markers by scanning them as the disk rotates. Provided the capstan transports the tape 50 slippage free, the rotation of the disk is indeed indicative of the passage of particular tape portions underneath the write heads 51. If the tape 50 is provided with a separate, i.e., an eighth clock track defined by pre-recorded markers and which define the desired bit or character spacings on the tape 50, then, of course, one will monitor these clock bits on the tape 50 and the generator 53 responds to these markers to provide the clock signals accordingly.

In any event, the output line 54 of the generator 53 provides pulses indicative precisely of the passage of similar tape increments under the write heads 51. Since recording at constant character density on the tape is desired, these pulses also define the desired rate of transfer of bits and characters onto the tape 50. In other words, it is the clock 53 which controls ultimately the writing of characters in the parallel-by-bit format onto the tape 50 and thereby determines the bit density on the tape. With this we proceed to the description of the withdrawal of data from the memory 30 for purposes of recording.

The character held in the memory 30 for the longest period of time is withdrawn therefrom through output channels 42. The characters are, of course, withdrawn from the memory in a serial-by-bit format and fed into an output register 43. The output register 43 is associated with a flag flip-flop 45 which must be in the reset state in order to permit new data to be set into the output register 43. Therefore, a control gate 46 has an inhibitor input which inhibits this gate 46 for as long as the flag flip-flop 45 is in the set state. In addition, of course, the transfer from the serial memory 30 through the channel 42 into the output register 43 requires seven shifting pulses which must be derived from the bit clock 31.

The period of shifting seven bits from serial memory 30 to the output register 43 is determined whenever the character counter 35 has reached the count state "one." This is monitored by a detector 47 which continuously monitors the count state of the character counter 35. The character counter 35 will be in the count state "one" for a full character period, and thereby provides an enabling input for the gate 46, which now in this case can furnish seven shifting pulses for the transfer channel 42 and for the interstage coupling gates of register 43 to permit seven bits to be serially transferred from the serial memory 30 to the output register 43.

A signal line 48 responds to the falling edge of the output of the detector 47 to set the flag 45, which is now indicative of the fact that a full character is in the output register 43, and until this character has been withdrawn from the output register 43 no further characters can be set into it. The same signal line 48 is used additionally to decrement the number held in the character counter 35 by "one," which thereby causes a relative shift in the serial memory 30, because subsequently the character counter 35 will reach any particular number for one counting unit later, and this in fact delays the time the comparator 39 can respond to a coincidence of numbers, which in turn means that the next character will be set from input register 20 into serial memory 30 by one character period later in comparison with the constant cycle time of the serial memory 30.

This decrementation of the count number in character counter 35 means also that the character which was previously recycled during count state "two" will now be recycled during count "one" and thereby it becomes the character to be withdrawn next. All other characters are "shifted" in the delay line 30 accordingly, whereby however this shifting is a precession and with reference to the character counter 35 and not absolutely in time.

The signal in line 48 decrements also the up-and-down counter 36 because a character has in fact been withdrawn from the memory 30. This subtraction of unity from the number held in counter 36 and the "shifting" of characters in line 30 ensures, that the next character fed into the delay line will indeed occupy the last place therein.

It should be noted, that the counter 35 is in the count state "one" for two character periods whenever a character is being withdrawn during the first one thereof, because an incrementation is followed directly by a decrementation. At the end of the first one of these periods flag 45 is set to inhibit gate 46 from producing additional shift pulses during the second character period in which counter 35 is in the count state "one."

The character, i.e., the seven bits of the character held in the output register 43 can be transferred therefrom in a parallel-by-bit format to a record register 55, which transfer is to occur strictly in synchronism with the signals from line 54, explained above as being indicative of the desired character and bit spacings on the tape 50. These pulses in line 54 are used, therefore, to control the transfer of data from register 43 to register 55, which means that the pulses in line 54 may, for example, furnish clock pulses for the stages of register 55. Whenever there is such a clock pulse in line 54 the output of register 43 will be clocked into register 55.

For normal operations, no other conditions should exist for this transfer, and the system must be operated so that for each pulse in line 54 a character is in fact available in register 43 for transfer to record register 55. This in turn means, that the circulating period of delay line 30 must be shorter than the shortest period in between two pulses in line 54 expected to occur and that memory 30 must not be empty.

The register 55 includes, in addition, suitable amplifier stages which control directly the seven record transducers 51. A clock pulse in line 54 resets the flag flip-flop 45 as the transfer of data from register 43 to register 55 renders register 43 immediately available for accepting new data from memory 30 under conditions previously explained.

Having described the process of the transfer of data from the unit 10 to the tape 50 it shall be explained briefly that the control of the data transfer to and from memory 30 in response to operation of the two counters 35 and 36 operates correctly indeed. If T is a character period (=seven bit periods) and if the total capacity of the delay line is N characters, then the cycle period thereof is NT. The number of characters circulating in the register may be M, and the "oldest" one will be reset into the delay line for recirculation at count state "I" of counter 35. Assuming that no new character has been set into register 12, then at count state "M" line 23 could be opened, but will not as flag 25 blocks it, so that the last character, which is the "newest" in the delay line will also be recirculated unimpaired. Thereafter only zero bits corresponding to $(N-M)$ characters will be circulated, etc. This can be regarded as the idle state.

In the meantime a new character may have been passed into register 12, and from there to register 20; the up-and-down counter 36 was incremented to $M+I$. Character counter 35 reaches that number right after the previously "newest" character has been recirculated, and now the character in input register 20 is shifted into the delay line to now become the "newest" one therein, and it properly circulates in the delay line now in the last position of all the characters therein.

The withdrawal of a character from the delay line is preceded by a clock pulse in line 54 which causes the transfer of a character from register 43 to register 55, to thereby render register 43 available for the acceptance of another character flag 45 is reset. Since the recording techniques require availability of a character when demanded by the clock 53, a character must now be transferred to register 43 as soon as possible. If the memory recycle period is shorter than the rate of withdrawal commands as evidenced by clock pulses in line 54, this character transfer from memory to register 43 will indeed occur before the next pulse in line 54.

Upon actual withdrawal of a character from memory at count state "1" of counter 35, counter 36 is decremented, so that the next transfer of a character into the delay line 30 will be one character count earlier, but this does not conflict with the existing circulation because the decrementation of counter 35 means that a transfer into the delay line will be one character count later, thus maintaining the same phase relationship as between the two counters 35 and 36 as if no transfer out of the delay line had occurred. As the actual transfer of a character into the delay line 30 is preceded by an incrementing pulse for counter 36, that character will occupy thereafter last place in the delay line indeed. One can thus see that character withdrawal and insertion are largely independent processes, as in between two withdrawals there may be any number of insertions, and in between two insertions there may be any number of withdrawals, these processes being limited only by the capacity of the delay line memory and by the actual availability of data therein but neither sequence must be faster than the circulation of memory 30.

We now proceed to the description of how the counter 36 is being used to control the tape drive motor 52. The counter 36 is incremented or decremented each time a character is fed into it or withdrawn therefrom. Thus counter 36 holds a number indicative of the number of characters in memory 30 (plus register 20). The content of this buffer memory is now used in turn to determine the rate of withdrawal of data from the memory 30. That rate is determined directly by the bit clock 53 driven by capstan motor 52. Therefore, the "up and down" counter 36 must control the motor 52 to thereby become the primary controller for the withdrawal of characters.

The digital number held in the "up and down" counter 36 is monitored by a digital-to-analog converter 61 providing an analog signal representative of the instantaneous value of the digital number held in the counter 36. Analog converter 61 feeds its analog output to a compensating network 62 which provides the necessary frequency response correction to achieve the required bandwidth and damping in the capstan servo system. The output of the compensation network 62 is then passed to a summing network 63 receiving additional inputs as described below. The output of the summing network 63 is the input of the motor drive control circuit 64 so as to control the power supplied to capstan motor 52 for driving same.

The motor 52 is now driven in such a manner that for increasing content of the serial memory 30, as evidenced by a larger output of the DA converter 61, the speed of the motor 52, and, therefore, the speed of the tape, and, therefore, the pulse rate produced by clock 53, increases. On the other hand, the motor 52 is caused to stop if the content of memory 30 tends to drop below a particular minimum. It is necessary to prevent the serial memory 30 from being emptied completely during normal operations. It is, particularly important that the memory is never emptied for those cases in which the computer 10 issues data irregularly and/or at a low rate. Whenever the tape moves so that tach-pulses are produced by clock 53, a character must be available in register 43 for transfer to the recording amplifier register 55. That can be ensured only if the tape is caused to slow down or stop when the memory tends to be emptied. It is, therefore, apparent that by operation of this entire circuit a constant character density on tape 50 can be attained regardless of the rate with which the computer 10 provides the data. An upper limit, of course, is set by the maximum speed of transport the tape 50 can attain, as this sets a limit for the maximum frequency of tach or tape clock pulses. Therefore data can be recorded strictly at a constant bit density regardless of the degree of irregularity with which the computer 10 provides data.

There are, however, special situations in which a plurality of characters is supplied by the processor 10, due to a particular input-output type operation then performed by it. These characters are supplied at a constant rate, possibly followed by a pause. Such a plurality may form a record, to be distinguished from other records or plurality of characters. The recordings on the tape should be made in such a manner that subsequent readout of the tape permits selective reading of records without requiring the reading of the entire tape. This means that the several records presumed to be read later on individually must be spaced apart on the tape by a particular gap, having a length equal to the stopping and restarting periods of the tape, if the tape is to be read subsequently by means of a conventional, constant speed reading device. Such a conventional tape reading device will be at full speed up to the point when the last character of such a record has been read, and thereafter the tape will have to be stopped. For reading the next record or block at a later time, the tape must be restarted and must have attained full speed before the first character of this next block arrives. This is the reason that for conventional reading of a tape, it must have so-called interrecord gaps.

For an asynchronous readout this gap is not necessary, as is explained in Patent 3,406,378 of common assignee. However, it must be taken into consideraton that tapes may be used interchangeably on different units. Therefore it is necessary to provide a tape with such inter-record gaps so as to make it possible that conventional readout devices can be used also for such a tape. The circuitry to be described next is destined to produce on the tape such a gap. Conventionally a further distinction must be made between the abovementioned inter-record gap and a gap which sets aside groups of records; this type of gap is called a file gap, and is usually somewhat larger than an inter-record gap.

For a conventional recorder such a gap is in fact automatically produced if recording is had at a constant maximum tape speed. After recording the tape must be made to stop. Recording can be resumed only after the tape has been restarted and has attained full speed; thus there will automatically result such a gap on the tape. As was explained above, the asynchronous recorder according to the present invention having a buffer memory 30 and associated elements does not require such a gap and can basically produce gap-less records, because regardless of the time which elapsed in between issuance of two characters by processor 10, those characters are spaced apart on the tape by the constant density used throughout. Without further measures the tape would stop before the last character has been withdrawn from the buffer and would be recorded only after the supply of data has been resummed, whereupon the first new character will appear in the buffer next to the last "old" one, and they will be clocked out and recorded in immediate sequence.

Therefore, the equipment to be described in the following is optional in the sense that a record gap may or may not be produced. Details thereof will be developed more fully below. A computer (assuming the unit 10 to be a computer) will usually issue in a special channel a signal to the tape unit signalling the end of record. This end-of-record signal (EOR for short) will usually accompany or succeed the last character of a series of characters furnished by the computer 10. The channel 70 will receive the EOR signal at the time an inter-record gap is to be produced. If the tape were used exclusively in asynchronous units, that signal can be ignored. Where interchangeability of the tape for use in constant speed or asynchronous readers is contemplated, that EOR must now be used to control the production of a gap.

The end of record signal EOR is fed to a flip-flop 71 for setting same, for the flip-flop to control now the operations for the duration of the gap production. The flip-flop 71 when set thereby sets also a flip-flop 72, and these two switching operations together produce the following control operation, to be summarized first, and the effects thereof will be elaborated subsequently.

The set state signal from the flip-flop 71 is not only used to trigger set flip-flop 72 but also to provide an inhibiting signal to the gate 27. It will be recalled that the gate 27 controls normally the resetting of the write flag flip-flop 15 whenever a character is transferred from the write register 12 to the input register 20, and the reset state of the flip-flop 15 is indicative of the fact that the write register 12 can receive another character.

The signal from flip-flop 71 now is used to inhibit this resetting of the flag 15 so that the character held in the write register 12 cannot be destroyed in any manner at this time, as the flag 15 prevents the register 12 to accept any new data. Of course, unit 10 has just issued the end-of-record signal EOR so that at this time it is not to be expected normally that the computer 10 will issue new data right away. Nevertheless in order to give the tape system a high degree of autonomy, and in order to prevent errors conceivably occurring in the computer output from propagating into this external system, it is advisable at that point to effectively block the input of the tape system presently described; this is done by preventing the flag 15 to be reset and thereby the write register 12 is inhibited to receive new data.

Flip-flop 72 when set provides a gating signal to a gate 73 which when so enabled permits a clock pulse generator 74 to feed clock pulses into the output line of the gate 73. The clock 74 provides for example, signals at a rate equal to, or higher than, the normal maximum rate with which the computer 10 is expected to supply data. Therefore, this clock 74 provides a signal which can be regarded as a character simulator. The output of the gate 73 is used to supply signals to a counter 75 counting up to four clock signals after which count the counter 75 issues a control pulse into its output line 76. The output of gate 73, which is a pulse sequence at clock pulse rate, 2 kc., for example as long as flip-flop 72 is set, is fed as an alternative input to the incrementing input of "up-and-down" counter 36, to simulate an increase of characters in the buffer memory 30.

In summary then, when the signal EOR issues concurrently with a last character, the write register 12 is blocked from accepting further characters; the up-and-down counter 36 is incremented to simulate the supply of characters to the buffer; and after four pulses from the simulator clock 74 a control signal is issued (line 76).

Before proceeding with the description of the effect these control operations have on the data input circuit for memory 30, it should be mentioned that the register 12 may include conventional means to convert the bits as supplied by unit 10 to the so-called NRZ1 format (unless, of course, the unit 10 provides already characters in that format). This means in particular, that if a flip-flop stage of register 12 has a particular state that state is not changed if the next bit is a zero. Thus, the last character set into the register 12 causes the register stages to assume certain states. That character is transferred in the usual way to register 20. Whereby it has to be observed that the transfer is actually a copying process, during and after which the flip-flop states of register 12 are not changed. Any subsequent clock pulses in line 22 transfer, i.e., copy the same states of register 12 to register 20 which operation simulates the transfer of an all-zero character. Depending on whether the system operates with odd or with even character parity, the generator 21 will supply a one bit or another zero bit in the same fashion.

It will now be observed, that the EOR signal did not inhibit the gate 26 supplying the transfer pulses in line 22 for the transfer from register 12 to register 20, because the flag 15 remains now set. On the other hand, the same signal which inhibits gate 27 tends to inhibit gate 26 through gate 19. However, the pulses from gate 73 are supplied as alternative input for gate 19, so that each such clock pulse can in fact simulate a character transfer to register 20, and the gate 40 operates just as before to feed these all-zero characters into the memory 30.

The fourth simulator clock pulse causes issuance of a control signal in line 76 as stated which is used to put all flip-flops of this register 12 to one particular state, for example, resetting them all. Since it was assumed, register 12 holds and transfers all bits in the NRZ1 format, this resetting of all flip-flops at that time means that out of the last character that was held in the register 12 there has now been created, what can be called a longitudinal parity check character. This is true only if we assume that in the beginning of any recording the flip-flops of the register 12 are also all in the reset state. Since the first subsequent character as supplied by unit 10 at a later time will find the register stages in the reset state, that assumption is correct throughout the operation. Subsequent to the generation of the longitudinal parity check character the flip-flops of register 12 are maintained in the reset state as flag 15 continues to block the input for the register, but clocking through gate 26 and input shifting by gate 40 continues. As long as flip-flop 72 enables gate 73 all-zero characters are loaded sequentially into the memory 30 and are counted as characters in counter 36. In summary, when the last character of a record issues, four all-zero characters are generated followed by a longitudinal parity check character, followed again by all-zero characters. Those latter characters actually cause an emptying of the memory, which is completed when the longitudinal parity character is withdrawn.

While all the foregoing events transpire, recording of course proceeds. In due time, first the last character furnished by unit 10 will appear in the output register 43, then the four all-zero characters will appear and then the longitudinal parity character. It has to be observed here, that a sequence of all-zero characters recorded in the NRZ1 format cause actually a uniform magnetization to be applied by the amplifier 55 to the write heads.

Also, in the meantime the clock pulses in line 54 have continued to decrement the counter 36, and the circuit for motor 52 has controlled the speed of the motor so that the rate of the clock pulses in line 54 equals the rate of the clock pulses from clock 74 which is 2 kc. In due time the longitudinal parity character will appear in the recording register 55 to be recorded also. Here then is established again a situation in which all of the flip-flops of register 55 are in the same state (reset). This mere fact can be used to interpret the content of the register 55 as containing the longitudinal parity character. During normal recording the sameness of the states of all flip-flops is a rather improbable situation. However, in order to exclude even such an improbable event, it may be advisable additionally to monitor whether or not previously during four recording clock pulses, or maybe at least for one or two recordings, the flip-flops in the register 55 did not change states. Thus, presence of the longitudinal parity check character may be evidenced by detecting, first, at least one, maybe four sequential all-zero characters in register 55 followed by a coincidence of reset states for all register flip-flops. This situation is monitored by a device 81, which is a longitudinal parity character detector responding to and providing a signal into the line 82 whenever the longitudinal parity check character is being written onto the tape 50.

The signal in the line 82 is now used to trigger the flip-flop 83 the output signal of which inhibits the transfer of the clock pulses in line 54 to register 55. The same inhibitor signal also prevents any further transfer of characters from the serial memory 30 to the output register 43 by providing an alternative inhibitor signal for the gate 46. It should be noted that this is basically a redundancy, because at that time the memory 30 contains only zero bits, because there was a continuous copying of the same reset state of the flip-flops 20 into the memory 30, and nothing else can be withdrawn from the memory provided there is normal operation. However, in order to prevent the possibility that noise is introduced, it is advisable therefore to clamp the stages of the registers 43 and 55 to the reset state so that the write heads 51 continue to provide a uniform magnetizing current, which is, on one hand, indicative of a continuous recording of all zero characters, but which is also a safety measure which for this particular advantageous type of recording ensures a uniform magnetization of the tape through the gap without introducing spurious signals.

The signal in line 82 is now used additionally to reset flip-flop 72 and to disable gate 73. Thus, the counter 36 is not incremented any more, even though decrementing through the pulses in line 54 continues, causing the counter 36 to be reset to zero. The discontinuance of shifting pulses for register 20 is immaterial, as the memory is now empty and its output is blocked. Finally, the signal in line 82 occurring at the time of recordation of the longitudinal parity check character is used to set a single-shot or monovibrator 85. This single-shot monovibrator 85 can be set only as long as the flip-flop 71 is set which occurred at the beginning of the end-of-record mode when signal EOR was issued by the computer 10; one can also interpret the set state of the flip-flop 71 in that the system is now in the inter-record gap mode.

The single-shot 85 provides an enabling signal to a frequency discriminator 86 for the particular astable period of the monovibrator 85. This frequency discriminator 86 provides zero output for an input signal of a relatively high frequency, for example, 10 kc. Whenever a signal is applied to its second input 87 and does not have that frequency, because, for example, the frequency of the signal in line 87 is 2 kc., the discriminator 86 provides a D.C. output which is proportionate to the deviation of the frequency in line 87 from 10 kc. The output of discriminator 86 is now applied as a second alternative input to the summing network 63.

In order to determine the effect of the output frequency discriminator 86, we must consider two points; first, what is the input for signal 87 of the discriminator, second, what occurs in the "up and down" counter 36 normally controlling the input for network 63 and the motor drive circuit 64.

The input for line 87 is now the tach clock 53 whenever discriminator 86 is enabled. The signal train thus applied has a frequency of 2 kc. as this corresponds to the tape speed up to that point. Thus, there is a large deviation of the adjusted discriminator frequency (10 kc.) from the input signal frequency and the output of discriminator 86 is correspondingly large.

Next, it will be recalled that from the time the longitudinal parity character was in the record register 55 the counter 36 will not be incremented anymore but only decremented from the tach pulses in line 54. Thus, counter 36 will empty rapidly, and this has normally the effect of reducing the output of digital to analog converter 61 as input for network 63; thus there arises a tendency to stop the motor 52. Now, in the gap mode, the frequency discriminator 86 provides a signal which is rather strong. Therefore, any other signal applied to the motor drive 64, such as is supplied from the network 62, will be overridden by the output of discriminator 86 and motor 52 will now start up very rapidly and will tend to accelerate towards a higher speed, the line 87 will receive signals having an increasing rate and acceleration will continue until the speed is up to correspond to the 10 kc. rate.

Therefore, from the time the longitudinal check character has been recorded the motor 52 will be accelerated for a period of time determined by the period of enableness of the discriminator 86, which in turn is determined by the astable period of the single-shot 85. Whenever the time of the single-shot 85 has run, the discriminator 86 becomes disabled again, and the output thereof is removed from summing network 63. The time of the single-shot 85 is now determined by the gap requirement, so that the length of the gap desired to be produced has been traversed by the tape 50 as rapidly as possible.

After the time of single-shot 85 has run the trailing edge of the output thereof triggers a single-shot 88 the output of which provides for a short period of time a third input to the summing network 63 which is a strong pulse of opposite direction. The motor drive 64 is now controlled towards a reversal of the direction of motor 52 to thereby provide dynamic braking. Thus, the astable period of monovibrator 88 is the period needed to dynamically brake the motor. The falling edge of the signal provided by the single-shot 88 occurs after the time of single-shot 88 has run and is used to reset the flip-flop 71 and to thereby cause the system to leave the record gap mode.

A short remark is needed to the point why the motor is actually accelerated for a short period to traverse the desired gap distance. It was said above, that the production of an inter-record gap originated when for conventional, constant speed recording the tape had to traverse a certain distance after deceleration has commenced until actual stopping plus the distance traversed later on upon restarting and until full speed has been attained. In the asynchronous recorder described here the restarting period does not have to be waited out, because recording can commence as soon as the tape moves again at all. Thus, it is basically that distance to be traversed by the tape upon restarting which is traversed already now at a high speed and only then the motor is made to stop. This way, the desired gap is produced. The high speed in the gap mode shortens the time for producing the gap.

After flip-flop 71 has been reset, the system is made ready again for accepting new characters, to be supplied individually or in form of another large record block by the computer 10. The flag 15 was set throughout the gap mode, as gate 27 prevented its resetting. After inhibition of the pseudo clock 73–74 flag 25 turned false, but gate 26 remained blocked because "OR" gate 19 provided a false output. As flip-flop 71 turns false, gate 26 turns true, but only an all-zero character is transferred as the write register 12 stages were clamped to the reset state as long as flip-flop 71 was set. That transfer is not counted in counter 36 and remains uneffective. Since gate 26 is not inhibited any more, gate 27 turns true to now reset flag 15. Thereupon the write register 12 becomes again capable of accepting any new character. The memory 30 will first begin to fill up and when a minimum state of filling has been reached, the motor 52 will start up again and the operation will proceed as afore-described.

The end-of-file gap will be created whenever a signal called EOF is issued by the computer 10 to appear in line 90. This signal sets a flip-flop 91 which can also be called the file-gap mode control flip-flop 91. The set state of the flip-flop 91 triggers flip-flop 72 and, therefore, initiates the same sequence as in the inter-record gap mode which means, that after the last character of a record has been loaded into memory four all-zero bit characters are created, then a longitudinal parity character is generated, and then further all zero characters are simulated for transfer to serial memory 30 and the counter 36 is operated accordingly.

Whenever the longitudinal parity character is detected by detector 81 the same signal is produced in line 82 but now in this case of the end-of-file mode a single-shot 93 is being triggered providing an alternative enabling pulse to the frequency discriminator 86. The astable period of single-shot 93 is longer than the astable period of single-shot 85, in accordance with conventional requirements for the end-of-file gap to be longer than the end-of-record gap. Therefore, the motor 52 will be driven at the high "gap" speed for a longer period of time, and after the time of single-shot 93 has run, single-shot 88 is triggered again and a reverse torque is applied. The operation is very much the same as afore-described except for the duration with which the motor 52 is driven at a high speed evidenced by different time constants of monovibrators 85 and 93. However, conventionally, and for purposes of compliance with conventional requirements as to the recording format on tapes is another difference.

The end of the end-of-file sequence as evidenced by a trigger signal by single-shot 88, is being used to terminate the end-of-file mode in that it resets the flip-flop 91. The same signal, either directly or indirectly through the reset output side of flip-flop 91 (as is shown), is used to set the flip-flop 71, so that subsequently an end-of-record sequence is being initiated, controlling the circuit in exactly the same manner except that immediately preceding the changeover from the end-of-file mode to the end-of-record mode, for example, through a gate 97 all stages in register 12 are set to simulate an all-one character. Thus gate 97 responds to a set state signal from end-of-file control flip-flop 91 and to the falling edge trigger from monovibrator 88. This character will automatically be followed by four all-zero characters formed during this end-of-record sequence, and then a longitudinal parity character is formed as controlled from stage 75 which parity character will also be an all-one character. This enables the detector 81, later on, to initiate the control operations in the motor circuit needed to complete this appended end-of-record sequence.

It should be mentioned, that there is a pair of ganged switches 95 and 96 which are open as long as the system is to operate with the end-of-record and end-of-file sequences. When switch 95 is closed, the reset input sides of the flip-flops 71 and 91 and when switch 96 is closed the reset input side of flip-flop 72, all are connected to the output line 76 of the counter 75. The reason for this is that if the tape is to be recorded without gaps, the end-of-record and end-of-file sequences are still initiated at first but actually interrupted at the time the longitudinal parity character is produced and loaded into the memory. The end-of-record is thereby still evidenced by four all-zero bit characters followed by the longitudinal parity check character. No gap is needed if one knows that the tape as recorded will be read only in an asynchronous mode. In this case the next character after the longitudinal parity check character can directly be the first character of the new record or of the new file, without requiring any spacing. The recordation of the four all-zero characters followed by a longitudinal parity check character separates sufficiently two records. The single shots 85, 93 and 88 will never be triggered here, as the flip-flops 71 and 91 are reset long before the detector 81 can respond to the longitudinal parity character so that the resulting signal in line 82 remains ineffective.

The invention is not limited to the embodiments described above, but all changes and modifications thereof not constituting departures from the spirit and scope of the invention are intended to be covered by the following claims.

What is claimed is:

1. A data transfer system for connection to a source of digital signals organized in characters to be recorded on a movable storage medium, comprising:

- a buffer memory for receiving from the source the data as sequentially provided characters defined by digital signals for temporary storage;
- motor means for driving the movable recording medium;
- means for withdrawing characters from the buffer memory in the same sequence as received and at a rate corresponding to the speed of the movable medium, and including means for recording on the medium such characters when withdrawn;
- means responsive to the filling state of the buffer memory for controlling the speed of the motor means in response thereto, including starting of the motor so that the recording of data depends on the filling state of the buffer and commences independently from the termination of data supply to the buffer memory from the source; and
- means responsive to a signal supplied by said source and representing the termination of data supply by the source, for controlling the motor means over a predetermined period of time thereby overriding the control of the motor means from the filling state of said responsive means.

2. A data transfer system for connection to a source of digital signals organized in characters to be recorded on a movable storage medium comprising:

- a buffer memory for receiving from the source the data as sequentially provided characters defined by digital signals;
- motor means for driving the movable recording medium;
- means for providing a signal train having characteristics corresponding to the passage of similar increments of the storage medium;
- means responsive to said signal train for controlling the withdrawal of data from the buffer for recording;
- means responsive to said signal train for controlling the speed of the motor in accordance with a first characteristic as long as data are supplied by said source; and
- means responsive to said signal train for controlling the speed of the motor after cessation of the data supply and in accordance with a second characteristic.

3. A data transfer system for connection to a source of digital signals organized in characters to be recorded on a movable storage medium comprising:

- a buffer memory for receiving the data from said source as sequentially provided characters defined by digital signals;
- motor means for driving the movable recording medium;
- means coupled to the movable medium and connected to the buffer memory for withdrawing characters from the memory at a rate corresponding to the speed of the medium;
- means connected to receive the withdrawn characters and coupled to the movable medium for recording such characters on the medium when withdrawn;
- means responsive to the filling state of the buffer memory for controlling said motor means so that the buffer has at least one character available for withdrawal as long as the medium moves; and
- means responsive to a termination of data supply for controlling said motor to temporarily increase the tape speed and to subsequently stop the motor.

4. A data recording control system wherein data are to be recorded on a movable storage medium capable of storing reproducibly data bits in at least one track, comprising:

- motor means for driving said storage medium;
- a first control circuit for said motor means including a two directional counter further including a digital to analog converter to produce a control signal representing the counting state of the counter, the control signal being fed to said motor means for controlling the speed of said motor means in response thereto;
- a data buffer receiving data bits to be recorded, storing same temporarily and delivering them to locations permitting withdrawal for recordation;
- means for delivering first counting pulses to said counter to meter the quantity of data received by said buffer, such counting pulses to be counted in one direction;
- means for delivering second counting pulses to said counter to meter the quantity of data withdrawn from said buffer, such pulses to be counted in the opposite direction; and
- a second control circuit for said motor respective to cessation of data supply to said buffer for controlling said motor means to advance said medium over a particular distance.

5. A data transfer system connected to a source of data represented by digital signals organized in characters to be recorded on a movable storage medium comprising:

- a buffer memory for receiving from the source the data as sequentially provided characters defined by digital signals, for temporary storage;

means coupled to the movable medium for driving the movable medium;

means connected to be responsive to the filling state of the buffer memory and further connected to the means for driving for controlling the means for driving in dependence upon the filling state of the buffer;

means for withdrawing characters from the buffer memory in the same sequence as received and at a rate corresponding to the speed of the movable medium and including means for recording such characters on the medium when withdrawn;

means responsive to the reception of the last character of a sequence of characters as provided by the source, for generating at least one particular character as representation of the end of the sequence, and feeding same into the buffer; and means for controlling the motion of said movable medium subsequently to the reception of said last character independently from the filling state of the buffer memory.

6. A system as set forth in claim 5 and including means responsive to the reception of said last character for simulating at least temporarily a continuation of character supply to the buffer so that the means for driving is controlled to the extent the buffer is filled at least until said one particular character has been withdrawn from the buffer for recording.

7. A system as set forth in claim 5, said last means including means for driving the moveable medium independently from the extent the buffer is filled and for a pre-determined period of time after said one character has been recorded and at a speed faster than the speed of the medium corresponding to the normal supply rate of characters from the source.

8. A data transfer system for connection to a source of data represented by digital signals organized in characters to be recorded on a movable storage medium, comprising:

a buffer system including a recirculating delay line, input means connected to the source for receiving therefrom new characters and for feeding same into the delay line and including output means for permitting withdrawal of recirculated characters from the delay line;

timing means for tracking the circulation of characters through the delay line;

means responsive to a first particular representation as provided by the timing means for controlling the feeding of digital signals representing a character supplied by the source, through the input means into the delay line;

means responsive to a second particular representation as provided by the timing means for controlling the withdrawing from the delay line through the output means, digital signals representing a character and having circulated the longest in the delay line;

means connected to receive the withdrawn characters for recording them on the movable medium;

means connected to be responsive to the filling state of the delay line to provide an analog representative thereof; and means connected to the latter means for driving the movable medium at a speed dependent upon the filling state of the delay line.

9. A data transfer system for connection to a source of data represented by digital signals organized in characters to be recorded on a movable storage, comprising:

a recirculating delay line, including means for receiving new characters and including further means for permitting withdrawal of characters from the delay line;

counting means for counting the number of characters fed to the delay line and withdrawn therefrom to provide a representation of the net content of the delay line;

timing means for providing representations of circulation phases of characters in the delay line;

first means responsive to the representations as provided by the counting and timing means for selectively controlling the feeding of characters to and the withdrawing of them from the delay line; and second means responsive to the representation as provided by the counting means for controlling the rate of character withdrawal in dependence upon the filling state of the delay line.

10. A transfer system as set forth in claim 9 including means responsive to the reception of a sequence of characters as provided by the source, the sequence including a last character, for simulating the reception of additional characters at least for a period of time until the last character has been withdrawn from the delay line.

11. A transfer for connection to a source of digital signals organized in characters to be recorded on a movable storage medium, comprising:

a buffer having an input connected for receiving from said source the digital signals as sequentially provided characters;

means coupled to the medium for moving the medium;

means coupled to the medium and being responsive to the speed of the medium for withdrawing from the output of the buffer characters at the rate of passage of the medium and recording the withdrawn data at a rate dependent upon the speed of the medium;

first means connected to the buffer and to the means for moving, for controlling the means for moving in dependence upon the filling state of the buffer during a first phase of operation;

second means for controlling the means for moving the medium through a particular distance subsequently to the reception of the last character of a sequence of characters by the buffer, during a second phase of operation immediately succeeding the first phase; and means for stopping the means for moving subsequent to the second phase of operation.

12. A system as set forth in claim 11, including means responsive to control signals from the source for selecting the duration of the second phase of operation for selecting the particular distance.

13. A system as set forth in claim 11, said second means controlling the means for moving towards a speed higher than the speed of the medium during the first phase of operation.

14. A system as set forth in claim 11, and including means for simulating the passage of characters into the buffer after reception of the last character from the source to continue the first phase until after the last character has been withdrawn from the buffer.

15. A data transfer system for connection to a source of digital data to be recorded on a movable storage medium, comprising:

a buffer memory having an input connected for receiving from the source digital data;

means operating the buffer to cause shifting of the digital data received from the input to an output of the buffer;

means responsive to termination of data supply by the source to simulate supply of additional data;

means connected to be responsive to the filling state of the buffer to provide a control signal in response thereto;

means coupled to the movable medium for driving the movable medium in continued response to the control signal as long as the buffer is not completely filled with simulated characters; and means connected for controlling the means for driving subsequently to completion of withdrawing all characters from the buffer as supplied by the source, independently from the filling state of the buffer until stopped.

16. A buffer system to be interposed between a source for digital data and transducer means coupled to a movable medium for recording the digital data thereon, there being means for moving the medium past the transducer means, the combination comprising:

a buffer memory connected to the source for receiving digital data, further connected to the transducer means for withdrawing digital data and feeding same to the transducer means after temporary storage in the buffer memory;

first means coupled to the movable medium to control the supply of data to the transducer means in dependence upon the instantaneous speed of the movable medium;

a counter respectively incremented and decremented in synchronism with the data supply to and withdrawal from the buffer memory to assume count states representative of the state of filling of the buffer;

second means connected for simulating data supply after termination of data supply by the source by incrementing the counter accordingly until all data supplied by the source have been withdrawn from the buffer;

third means connected to the counter for controlling the means for moving so that the rate of data withdrawal prevents the buffer memory from filling up completely; and fourth means connected to be responsive to the completion of data withdrawal from the buffer to control the means for driving for acceleration and subsequent stopping independently from the third means and the filling state of the buffer, for the rapid formation of a data gap on the medium.

17. A system as set forth in claim 16, the buffer memory including recirculating delay line and further including countermeans cooperating with the counter for precession control to change the relative position of any circulating data with respect to the circulating period of the delay line in response to supply of additional data to the delay line from the source and withdrawal of data from the delay line.

18. A system as set forth in claim 16, the fourth means including a frequency discriminator set for a frequency in excess of a particular supply of data from the source, to control the means for moving at a higher speed than during recording, the frequency discriminator connected to receive signals produced in synchronism with the passage of the movable medium.

19. A system as set forth in claim 16, the second means including means for the formation of a particular character to be fed into the buffer in particular relation to the last data character of the source, the fourth means operating in response to detection of withdrawal of the particular character.

20. A system as set forth in claim 16, including means responsive at least to one control signal from the source, for the control of the gap length, the fourth means including means to stop the carrier after the movable carrier has traversed the respective gap length after recording of the last character supplied by the data source.

21. A transfer system as set forth in claim 9, the timing means including a second counting means operated in synchronism with the circulation of characters in the delay line, the first means operating in response to particular relation between the count numbers in the first and second counting means and in response to a particular count number in the second counting means, and including means to modify the operation of the second counting means to obtain a shift in relative position of the characters as circulating in the delay line in relation to the counting process of the second counting means.

22. A data transfer system as set forth in claim 8, the timing means including a first counter operated to provide representation of the number of characters in the delay line, for controlling the speed of the movable medium;

the timing means including a second counter to track character circulation in the delay line, to establish one of the first and second representations when reaching a particular count number, and to establish the other one of the first and second representations when the count agrees with the count in the first counter.

23. A transfer system as set forth in claim 22, including means to modify the count in the second counter with each character withdrawal to provide a relative circulation phase shift of the characters still circulating in the delay line.

24. A data transfer system as set forth in claim 22, including a digital to analog converter connected digitally to the first counter for control of the means for driving by the resulting analog output, and including means to provide an analog signal to the means for driving in representation of a relative high speed for the movable medium temporarily overriding the control as provided by the digital to analog converter.

25. A transfer system as set forth in claim 24, comprising means to control the duration of the production of the overriding analog signal.

26. A data transfer system as set forth in claim 8, including means for emptying the delay line by simulation of character supply to the buffer through operation of the timing means, and further including means for overriding the control of the driving means in response to the filling state of the buffer after all characters from the source have been recorded to cause the driving means to move the medium over a data gap defining distance and to stop the driving means thereafter.

References Cited

UNITED STATES PATENTS

| | | | |
|---|---|---|---|
| 3,012,230 | 12/1961 | Galas et al. | 340—172.5 |
| 3,293,613 | 12/1966 | Gabor | 340—172.5 |
| 3,366,933 | 1/1968 | Carp et al. | 340—172.5 |

RAULFE B. ZACHE, Primary Examiner